United States Patent [19]
Nelson et al.

[11] Patent Number: 5,568,644
[45] Date of Patent: Oct. 22, 1996

[54] METHOD AND APPARATUS USING A TREE STRUCTURE FOR THE DISPATCHING OF INTERRUPTS

[75] Inventors: Matthew R. Nelson, Sunnyvale; Thomas E. Saulpaugh, San Jose, both of Calif.

[73] Assignee: Apple Computer, Inc., Cupertino, Calif.

[21] Appl. No.: 435,967

[22] Filed: May 5, 1995

[51] Int. Cl.$^6$ .................................. G06F 3/04; G06F 9/18
[52] U.S. Cl. ............................................ 395/741; 395/742
[58] Field of Search ...................................... 395/800, 732, 395/741, 733, 742

[56] References Cited

U.S. PATENT DOCUMENTS

| | | | |
|---|---|---|---|
| 5,301,333 | 4/1994 | Lee | 395/732 |
| 5,394,556 | 2/1995 | Oprescu | 395/800 |

OTHER PUBLICATIONS

Thomas Cormen, Charles Leiserson, Ronald Rivest, Introduction to Algorithms, 1990, pp. 91–97.

Primary Examiner—Jack B. Harvey
Assistant Examiner—Jeffrey K. Seto
Attorney, Agent, or Firm—Blakely, Sokoloff, Taylor & Zafman

[57] ABSTRACT

Each device is represented by a node in a hierarchical tree, referred to herein as an interrupt source tree (IST). The root and intermediate nodes of the IST represent dispatching or determining points; this removes the need for the device drivers to contain dispatching code; the drivers now only need to contain interrupt handling code specific to the device itself. At these nodes code is executed to determine which branch to take down the IST. The bottom nodes are the leaf nodes; the leaf nodes identify the device interrupt handler. By moving the determination steps performed by the different device drivers to the nodes of the IST, the device drivers are modular and portable. Furthermore, changes to the computer system configuration, which in the prior art would require modification of all device drivers, can be adapted to by modification of the IST.

28 Claims, 4 Drawing Sheets

△ Root member
◇ Parent child member
○ Leaf member
□ Interrupt set

METHOD AND APPARATUS USING A TREE STRUCTURE FOR THE DISPATCHING OF INTERRUPTS

BACKGROUND OF THE INVENTION

1. Field of the Invention

The present invention relates to interrupt processing in a computer system. More particularly, the present invention relates to interrupt dispatching.

2. Art Background

In a computer system, an interrupt is an exception that is signaled to the processor by a hardware device. Devices use interrupts to notify the processor of a change in the device's condition, such as the initiation or completion of an I/O request. Many devices can initiate interrupts, including third party devices connected through expansion slots provided in the computer system. A variety of devices can be coupled to the computer system, including disk drives, audio cards, video cards and the like. In addition, multiple devices have been configured on a card that fits into a single expansion slot.

An interrupt causes the processor to suspend normal execution, save the current execution state and execute an interrupt service routine also referred to as an interrupt handler. Upon completion of the interrupt service routine, the state prior to the execution of the interrupt service routine is restored and the processor resumes normal execution.

It is not uncommon that multiple interrupt signals are issued concurrently. Each device is assigned to have a priority level, thereby enabling the processor to use the priority levels of the devices to determine the order the interrupts are serviced.

Each device has an associated device driver. The device driver is code executed by the processor to interface with the device. The device driver includes the interrupt handler for the device.

The information received by the processor upon issuance of an interrupt is minimal. For example, an interrupt may simply be a signal that transitions from an inactive state to an active state to indicate that an interrupt request has been issued. Some systems include multiple interrupt lines such that the line the interrupt signal is driven on indicates some limited information regarding the interrupt. Generally, however, the processor responds to an interrupt request by first determining the device that issued the interrupt. This process of determining the interrupting device is referred to as interrupt dispatching. To determine the interrupting device, the processor will activate device drivers containing subroutines which when executed reads certain registers, flags or memory locations on the computer system to determine if the driver's corresponding device issued the interrupt. The interrupt dispatching process is closely tied to the computer system hardware configuration as the process often requires examination of registers and memory not located on the device that issued the interrupt. The hardware examined can vary from device to device, making it impossible for the processor to determine without accessing the device driver code for each device. In addition, the device drivers will typically contain code regarding the priority of the device.

However, if all or a portion of the hardware changes, the interrupt dispatching mechanism changes. This often dictates that the device drivers be modified to operate with the changed hardware. For example, if the device is connected to a different hardware platform, the device driver will have to be manually modified as to the steps performed, e.g., the examination of specific registers, will most likely be changed. If a new type of device is connected to an existing hardware platform with existing devices, and the new device alters the priority of the interrupts, the device drivers of the existing devices will have to be modified to comply with the change in priority.

Bus bridges introduce additional issues. For example, in a computer system that follows the Peripheral Connector Interchange (PCI) standard, one slot may be allocated to a bridge which connects to a second PCI bus to connect additional devices. However, a bridge typically communicates minimal information that an interrupt request has been issued by a device. No information is typically conveyed as to which device issued an interrupt or if multiple interrupts were issued. Therefore, the device drivers of each device coupled through the bridge would have to be polled or interrogated to determine the device(s) that issued an interrupt.

SUMMARY OF THE INVENTION

The present invention provides an interrupt dispatching mechanism which abstracts the interrupting dispatching function from the device drivers. More particularly, the majority of the responsibility for determining the interrupting device is removed from the device drivers such that portability between hardware platforms and modification of interrupt priorities is simplified. Each device is represented by a node in a hierarchical tree, referred to herein as an interrupt source tree (IST). The root and intermediate nodes of the IST represent dispatching or determining points; this removes the need for the device drivers to contain dispatching code; the drivers now only need to contain interrupt handling code specific to the device itself. At these nodes code is executed to determine which branch to take down the IST. The bottom nodes are the leaf nodes; the leaf nodes identify the device interrupt handler. By moving the determination steps performed by the different device drivers to the nodes of the IST, the device drivers are modular and portable. Furthermore, changes to the computer system configuration, which in the prior art would require modification of all device drivers, can be adapted to by modification of the IST.

BRIEF DESCRIPTION OF THE DRAWINGS

The objects, features and advantages of the present invention will be apparent to one skilled in the art from the following detailed description in which.

DETAILED DESCRIPTION

The present invention is directed to an innovative interrupt dispatching mechanism. In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1A:
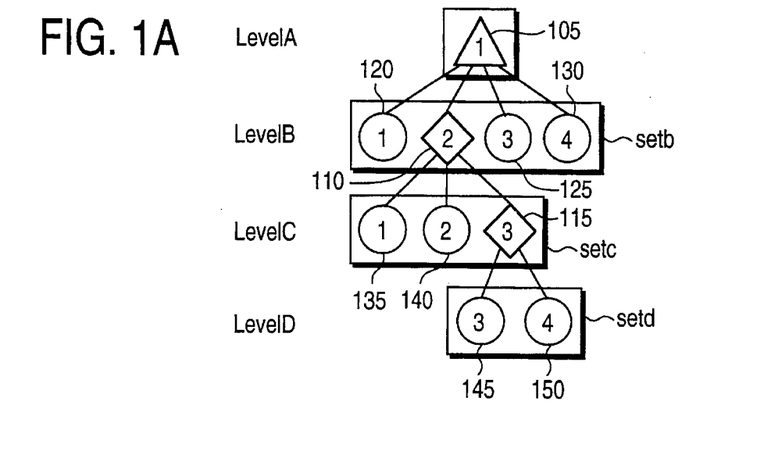
FIGS. 1A and 1B visually illustrate an embodiment of an Interrupt Source Tree (IST) in accordance with the teachings of the present invention.
Figure 1B:
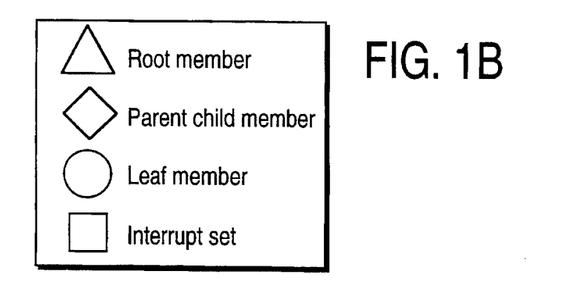

This innovative interrupt dispatching mechanism enables the interrupt dispatching portion of the interrupt process to be removed from the drivers and incorporated into a hierarchical tree referred to herein as the Interrupt Source Tree (IST). Each set or level of the tree hierarchy represents a finer characterization of a device that generated the interrupt (interrupt source). FIGS. 1a and 1b illustrate a simplified example of an IST. The IST consists of a root node 105, intermediate nodes 110, 115 and leaf nodes 120, 125, 130, 135, 140, 145, 150. The top level of the tree consists of a single interrupt node that has no parent node and is referred to as the root node 105. The rest of the nodes in the tree branch down from the root node with each node acting as a child node to the interrupt nodes above it, and as a parent node to the interrupt nodes below it. When an interrupt node has no child nodes, it is referred to as a leaf node. A group of children related to the same parent is referred to as a set. For example, nodes 110, 120, 125 and 130 belong to the same set. The hierarchy may be constructed of many levels. The number of levels down a leaf node is from the root node indicates the number of evaluations that will be performed before servicing of the device.

The root node 105 and intermediate nodes 110, 115 contain steps that indicate a branch to take out from the node in accordance with certain information determined. For example at one node, code is executed to read a certain register. The value stored in the identified register may indicate a device from a certain class of devices issued the interrupt. The path taken down to the next level is determined from the value. As lower and lower nodes are traversed, more specific determinations are made to narrow down the possible devices that issued the interrupt until a leaf node is reached. Each leaf node 120, 125, 130, 135, 140, 145, 150, contains an identification of the interrupt handler or interrupt service routine (ISR) for that device.

In the present embodiment, each node can typically contain the following information:

a pointer to an interrupt service routine (ISR);

a pointer to an interrupt enabler routine (IER):

a pointer to an interrupt disabler routine (IDR)

a pointer to the interrupt acknowledge routine (IAR): and a reference constant (refcon).

There are two types of ISRs. The first type, referred to as a transversal ISR, routes interrupt processing from a parent node to one of its child nodes. Transversal ISRs are always attached to root or parent/child nodes. The second type of ISR directly handles a device's interrupt request for service. This type, called a handler ISR, is always attached to a leaf node.

In the present embodiment, when a handler ISR is invoked, it is supplied with three parameters. The first parameter indicates the source of the interrupt and consists of an InterruptSetID and InterruptMemberNumber, forming the InterruptSetMember parameter. This allows a single ISR that has been registered with multiple interrupt sources to determine which source caused the current interrupt (i.e., which device issued the interrupt request). The second parameter, the reference constant value, is a value made available for use by the device driver developer if there is a desire to customize the IST. The third parameter is a numeric value that tells an ISR whether it has been invoked more than once in a single interrupt tree traversal process. This parameter is particularly useful to traverse back up the tree to determine alternate branches and leaf nodes if the incorrect device has been identified by the IST. The parameter provides the necessary flag to indicate to a particular node that an alternate branch to an alternate child node should be taken out of the node. This parameter is reset at the completion of the process when the correct device that caused the interrupt is identified.

An IER turns on an interrupt source's ability to propagate a hardware interrupt. Enabling a root node or parent/child node also allows any pending interrupt requests from any hierarchically lower child to propagate. It follows that an IDR turns off an interrupt source's ability to propagate a hardware interruption. It returns a value indicating the previous state of the interrupt source (enabled or disabled), which can be used to decide if subsequent enable operations are required. Disabling a root member or parent/child member also prevents any pending interrupt requests from any hierarchically lower child from propagating beyond the node identified in the IDR. For example, if a first interrupt is generated, the root node may identify that the root node be disabled. This prevents all subsequent interrupt requests from causing an interrupt until a subsequent IER is issued. Similarly, an IDR for a node at a lower level node can cause a certain type of device or priority level of a device to be unable to cause an interrupt because the disable node prevents a branching to the corresponding child nodes which lead to the leaf nodes containing the device handler ISRs.

The IAR provides a handshaking mechanism to prevent the loss of interrupt requests when a device issues multiple interrupt request between IST traversals. If the IAR is utilized, a requesting device will be prevented from issuing another interrupt request until the interrupt acknowledge signal is received. For example, a handler ISR will include code to invoke the IAR function to allow the device's next interrupt to propagate and to be processed by the interrupt dispatching process.

Figure 2:
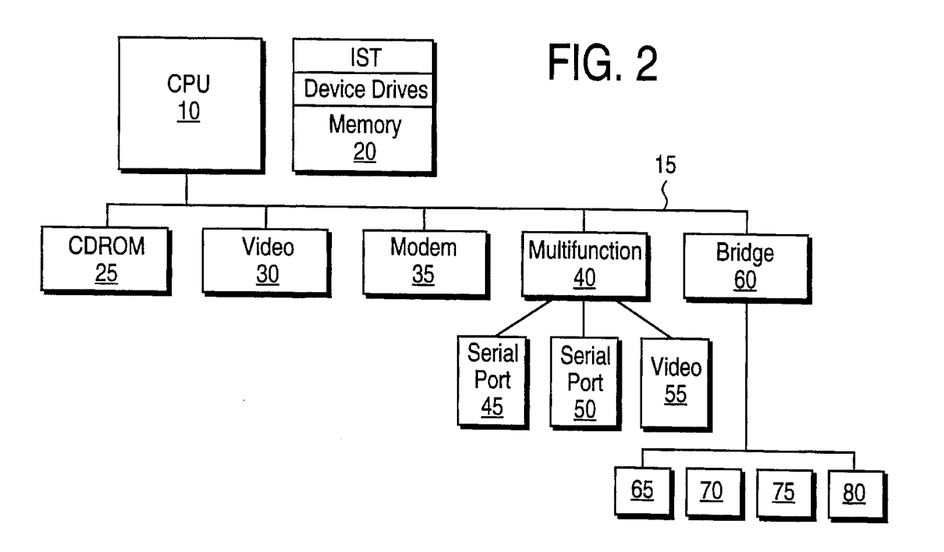
FIG. 2 is a block diagram illustration of an exemplary computer system utilizing the interrupt dispatching mechanism of the present invention.

A simplified block diagram of an exemplary computer system that utilizes the interrupt dispatching mechanism of the present invention is shown in FIG. 2. Referring to FIG. 2, the computer system includes a variety of elements including a processor 10 and memory 20. Typically the memory functions as a storage medium for the IST and ISRs described herein. A device or expansion bus 15, such as the Peripheral Connector Interchange (PCI) bus is coupled between the processor 10 and the devices 25–60. A variety of devices are coupled to the computer system through the bus 15, such as a CD ROM 25, video card 30, modem 35, a multifunction card 40 and a bus bridge 60. The multifunction card supports a plurality of devices or functions on a single card, for example functionality represented by two serial ports, 45, 50 and video 55. The bus bridge 60 provides a connection to an additional bus 85, such as a second PCI bus to which additional devices 65, 70, 75, 80 are connected. The IST will support bridges 60 and multifunction cards 40 regardless of the number of devices behind the bridge or located on the card.

Figure 3:
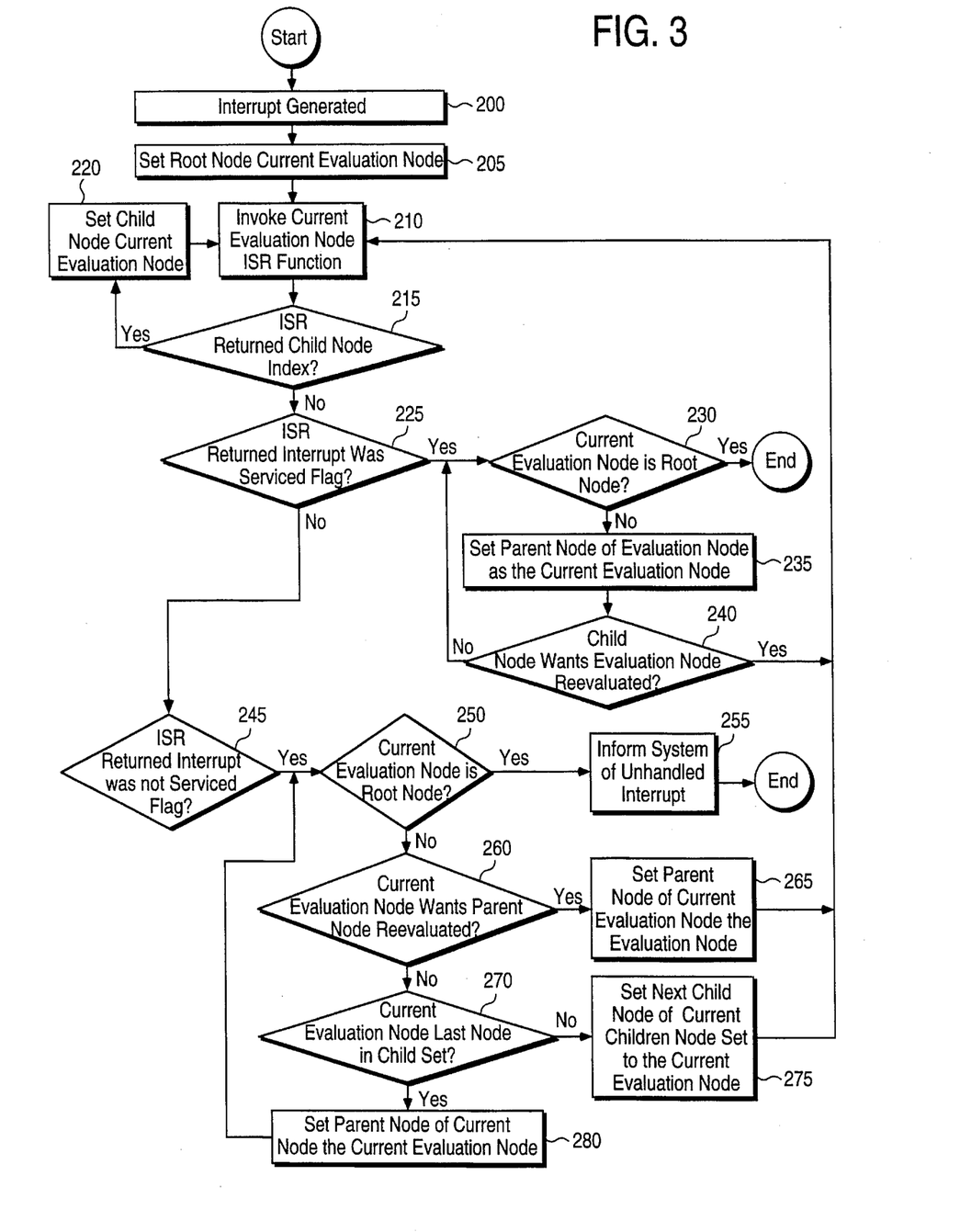
FIG. 3 is a simplified flow chart generally outlining the steps performed in the interrupt dispatching process in accordance with the teachings of the present invention.

A simplified example of the interrupt dispatching process using the IST is illustrated by the flow chart of FIG. 3. It is readily apparent that the process can be implemented a variety of ways. At step 200, an interrupt is generated and the interrupt dispatching process or interrupt engine begins processing at the root node of the hierarchical IST by making the root node the current evaluation node, step 205. The ISR of the current evaluation node is then invoked, step 210. Each leaf node provides a device handler ISR to service a device. Each non-leaf node provides a transversal ISR that contains criteria or steps to perform to determine which branch to take out of the node to a child node for continued categorization of the interrupt. In the present embodiment, the transversal ISR invoked for a parent node returns the ID of the child member to go to. The criteria, for example, may be to examine a certain register and branch based upon the value stored in the register.

At step 215, it is determined whether the ISR invoked returned an index to a child node. If the ISR returned the index to a child node to branch to, the child node identified becomes the current evaluation node, step 220. The process then loops back to step 210 to invoke the ISR of the new current evaluation node. This process continues until the invoked ISR does not return a child node index.

If the ISR does not return an index to a child node, then the current evaluation node is a leaf node and a handler ISR was invoked. The interrupt dispatching process then determines whether the invoked handler ISR returns a message that the interrupt was serviced or a message that the interrupt was not serviced. Therefore, at step 225, it is determined if the invoked handler ISR returned an "interrupt was serviced" flag. This indicates a successful traversal of the IST resulting in the servicing of the interrupt generated by the requesting device.

The present embodiment provides an enhancement to the interrupt dispatching process that assists in minimizing latency between the issuance of an interrupt request and the servicing of an interrupt. In addition, this enhancement adds even more flexibility to the interrupt dispatching process. More particularly, once the interrupt has been serviced and the "interrupt was serviced" flag is returned, the interrupt dispatching process will traverse back up the IST to determine whether other nodes require evaluation. For example, this is particularly useful to determine, before ending the completing the interrupt dispatching process, whether there are other interrupt requests pending that require service. Therefore, at step 230, if the evaluation node is the root node, the process of traversing back up the tree is complete and therefore the instance of the interrupt dispatching process is complete.

At step 235, the reverse traversal process begins by setting the parent node of the evaluation node to be the current evaluation node. Initially, the evaluation node is the leaf node containing the handler ISR just successfully invoked. Therefore, the leaf node's parent becomes the evaluation node. In the present embodiment, the child node of the current evaluation node indicates whether the evaluation node is to be evaluated by invoking of the evaluation node's ISR. However, it is contemplated in an alternate embodiment that the evaluation node itself determines whether the ISR is to be invoked. Thus, at step 240, the child node is looked to in order to determine whether the ISR of the evaluation node should be invoked. If the answer is yes, then the process continues at step 210 to invoke the ISR of the evaluation node. If the child node indicates, at step 240, that the parent node is not to be evaluated then steps 230, 235 and 240 are repeated, thereby traversing back up the tree until a node is to be evaluated or the root node is reached.

The handler ISR may also return a "interrupt was not serviced" flag. If this flag is returned, at step 245, the device that was attempted to be serviced by invoking the device handler was not the device that issued the interrupt request. Therefore, it is preferred that a process be implemented to traverse back up the tree and back down again to a different leaf node in order to find the device that issued the interrupt request. It is contemplated that the process may determine an alternate leaf node a variety of ways. The interrupt process may return to the root node to determine an alternate series of branches to reach an alternate leaf node. The interrupt process may also be configured to return to the prior invoked node or an alternate node at a predetermined level in order to determine an alternate leaf node.

In the present embodiment, the engine will regress back up the tree to a node, step 245, and back down the tree using an alternate path to reach an alternate leaf node. This process continues until the correct device is verified. To accommodate the regression process up the tree, it is preferred that the nodes include code to select alternate paths, referred to herein as "modifying options". If the node does not have modifying options, then simply the next node at the hierarchical level is invoked.

At step 250, if the current evaluation node is the root node, then the traversal back up the tree is complete and the interrupt dispatching process, step 255, sends a message that the interrupt was not handled and ends. If at step 250, the current evaluation node is not the root node, then at step 260, it is determined whether the current evaluation node wants the parent node to be reevaluated in order to determine an alternate branch. If the parent is to be reevaluated, at step 265, the parent node is set to be the current evaluation node and the process returns to step 210 to invoke the ISR of the current evaluation node. Depending upon the type of ISR invoked, an alternate handler will be invoked or an alternate branch will be traversed down to an alternate leaf node.

At step 260, if the parent node is not to be reevaluated, then a next child node off the same parent is evaluated. This process, reflected by steps 270 and 275, provide a systematic mechanism to evaluate each child of the same set (the children of a set are connected to the same parent node). Furthermore, it takes into account the chance that an alternate branch may be to a child of the same set as the current evaluation node. If the current evaluation node is the last child in the set, step 270, then at step 280 the parent node of the current evaluation node is set to be the current evaluation node and the process returns to step 250. Thus, once all children of the parent have been evaluated, the process will go traverse up one level to the parent. It can be seen that by default, i.e., no child node requests reevaluation of the parent node, traversal will be performed back up through the entire tree, thereby providing a systematic way to reevaluate nodes.

This process may best be visualized by example. Referring back to FIG. 1a, in this example, the ISR handler of the device represented by the IST handler located on level D, node 1 (145) issues an interrupt request. Interrupt dispatching begins by invoking the ISR of the root node (105) located on level A. The transversal ISR returns a node value of 2. This invokes the ISR of node 2 on level B (110), which returns a node value of 3. The ISR of node 3, level C (115) is then invoked and returns a node values of 1. This in turn causes the handler ISR of node 1 on level D (145) to be invoked. The handler tries to service the requesting device and returns a message that service is complete if the device was successfully serviced and a message of not complete if not serviced.

If the handler returns a message of not complete, the interrupt process proceeds to determine an alternate leaf node. For example, if the handler identified by node 1 (145) at level D returns a message that service was not completed and that the parent is to be reevaluated, then control returns to the parent node, node 3 (115) at level C and the parent node's ISR is invoked. If the child node does not indicate that the parent is to be reevaluated, then by default the system will branch to the next alternate child node, in the present example, node 2 (150) at level D. If the interrupt handler of the alternate node issues a message that the device is not verified, the regression process occurs again. In the present example, both child nodes of node 3 have been examined. The engine therefore regresses again to the next parent node, in the present example, node 2 (110) at level B. From the parent node 110, alternate paths are determined.

It can therefore be seen that a simple, but highly flexible, interrupt dispatching process is implemented using the IST. The interrupt dispatching process has been abstracted from the device drivers such that the drivers contain code specific only to the device, for example, the interrupt handler code. This results in interrupt code that is easily adaptable to most hardware or system platforms by configuration of the IST. Furthermore, this simplifies drivers for a plurality of identical devices. An example is a four port I/O card. Because the interrupt dispatching code, and therefore determining procedures are removed, the remainder of the driver code is equally applicable to each I/O port on the card.

Another advantage is that the interrupt processing is dynamic; even though the instance of the interrupt process was invoked in response to an interrupt request issued by a first device, if during traversal of the IST other interrupt requests are generated, an invoked traversal IST will make a determination of the child node to become the evaluation node (i.e., determine which branch to take) based upon all pending requests. Therefore, the device which issued the first request may not necessarily be the first device to receive service.

The IST by its construction takes into account the priority of devices. Although there is no explicit prioritization scheme reflected in the process, implied prioritization does take place. The fact that tree transversal proceeds from the root member toward leaf members gives members closer to the root a higher priority. Therefore, the hierarchical structure of the IST determines the system's fixed interrupt priority structure. Conversely, a transversal ISR is free to use any algorithm to decide which child member's ISR should be invoked—for example, an anti-starvation algorithm or a priority based on the value of InterruptMemberNumber. Whatever method is used, transversal ISRs provide the dynamic aspect of system's interrupt priority structure. Implementing the IST structure and ISRs sets the implied prioritization of all interrupts.

The IST also accounts for multifunction cards and bus bridges. A bus bridge and the devices coupled to it are typically accounted for by providing an extension, i.e., lower levels of nodes to the IST. At system initialization time, the system will probe the device, i.e., the multifunction cards or bus bridges for the number of sub-devices on that device. Many of today's bus bridges do not follow a common standard for communication of interrupt dispatching information. Therefore, the parent nodes corresponding to these extended devices coupled via a bus bridge will not initially have the information as to which device coupled to the bridge requested service. A similar occurrence may also happen with respect to extended devices located on multifunction cards. To accommodate bus bridges and multifunction cards, the parent nodes will include dispatching modification options to poll all of the child nodes to determine the correct path. Preferably, given that a polled architecture would be used, the parent will see to it that all of the extended devices requesting an interrupt are serviced during a single IST transversal. This will reduce interrupt latency of additional devices that also requested service at that time since the IST will not have to be reentered. Once all of the ISR handlers of the extended devices issue a not complete message (indicating that service is not needed), the parent will return a message that the interrupt is complete to the dispatching process.

Figure 4:
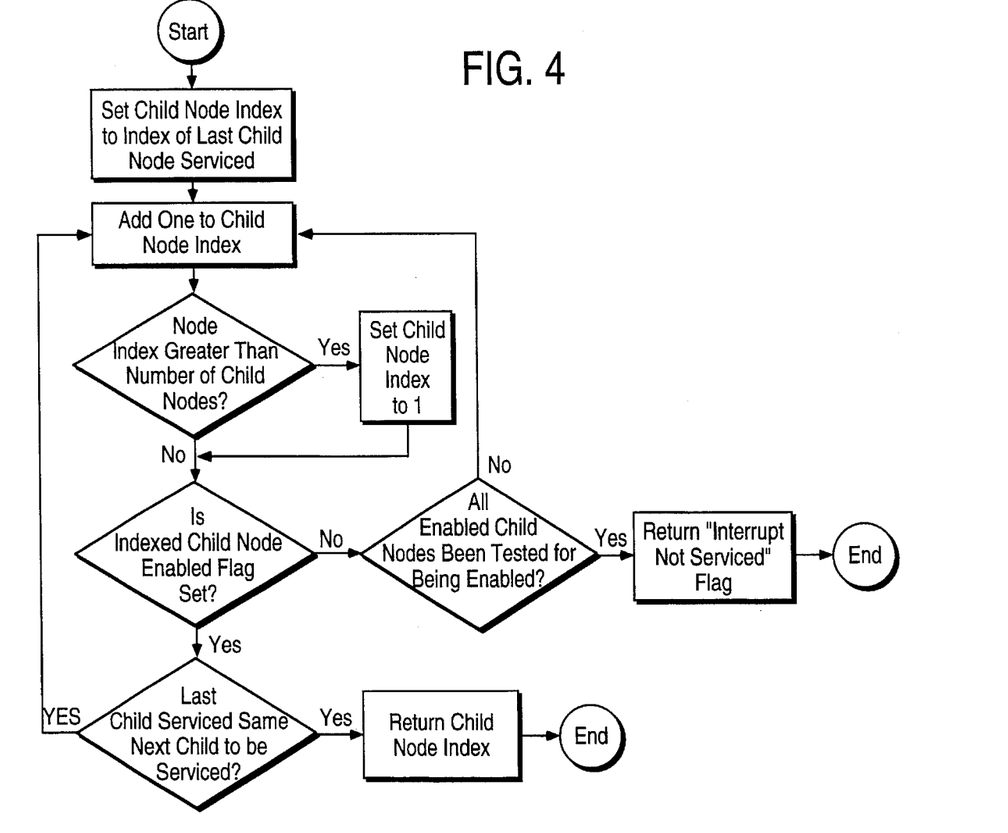
FIG. 4 illustrates the process in the context of bus bridges.

In the structure of bus bridges and multifunction expansion cards, it is preferred that the transversal ISR of the parent node implements a simple "fairness" algorithm that keeps any one extended device from dominating the interrupt service requests. An example of the fairness algorithm is illustrated by the flow chart of FIG. 4. This is done by making sure the same extended device is not serviced twice in a row, unless only one device is requesting service. In addition it is preferred that separate software flags are maintained for each extended IST member, to enable and disable interrupt servicing. Preferably the system operates such that invoking an extended IST member's IDR and IER functions has two implicit effects. First, invoking the IDR will only prevent the extended IST node's ISR from being invoked; it will not disable the devices ability to request an interrupt. It is the responsibility of the driver to disable interrupt requests from the actual device. Second, invoking the IER will not only allow the extended IST node's ISR to be invoked, but will also traverse the IST back to the main logic board's slot IST member; invoking the IER of each IST node encountered. This guarantees that a driver has only to invoke it's device's IER to allow interrupt requests through the IST.

Figure 5:
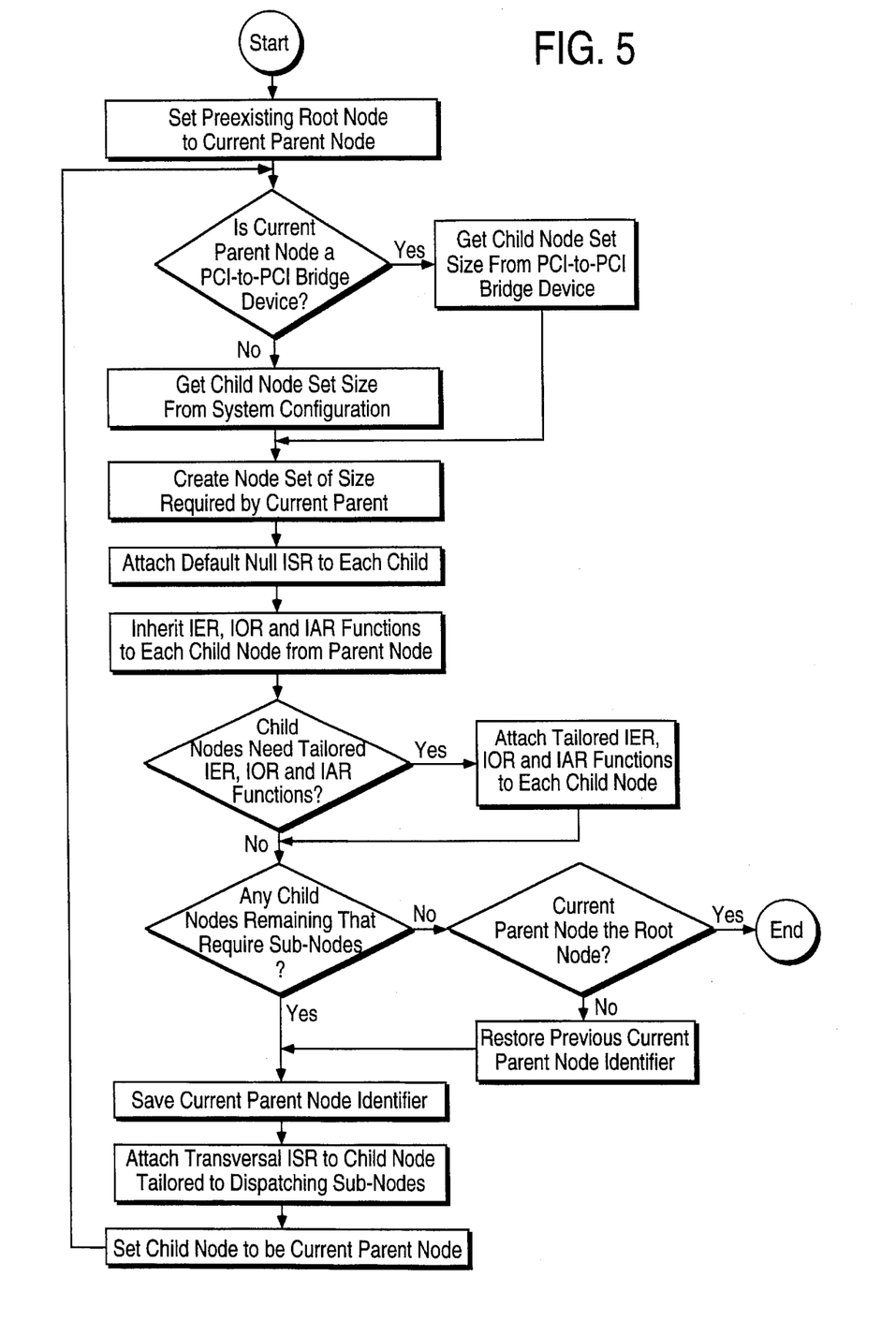
FIG. 5 illustrates an exemplary process flow for construction of an IST.

An exemplary process flow for construction of an IST is shown in FIG. 5. The IST construction process will vary from system platform to system platform. For purposes of explanation, the functionality of the process will be described herein without providing details of the actual code; such code is apparent to one skilled in the art from reading the functional description provided herein. In the exemplary form, the IST is automatically constructed at startup for all devices coupled to the bus. In this process, the interrupt tree is constructed by creating new sets of child nodes under existing child nodes, which thus become parent nodes. The preexisting root member is used as the parent node for the first layer of the tree. As each new child node is created, a null ISR is installed and its IER, IDR and IAR routines are inherited from the parent. Having child members inherit their parents' IERs, IDRs and IARs allows devices that don't have hardware enabling and disabling support on the main logic board to still use IER, IDR and IAR functions. Invoking an IER, IDR or IAR for such a device will transparently invoke the parent node's IER, IDR or IAR. At some point up the interrupt tree, main logic board hardware will physically enable, disable or acknowledge interrupts intended for the device.

If the system includes built-in interrupt controller hardware that can enable, disable and acknowledge interrupts for each of the interrupt nodes at the new interrupt level, IERs, IDRs and IARs tailored to each interrupt node are installed. When a child node becomes a parent node, a transversal ISR is installed on top of the null ISR for dispatching its child nodes. This process is repeated for as many layers and IST nodes as required. Therefore, the default IST created services all fixed hardware devices and slots in the system.

The process also provides for modification of the IST. For example, this enables one, such as an after market equipment provider, to easily add extensions to the IST. This is often needed to provide for devices that have special requirements. In the present embodiment, the IST can be constructed/modified using certain routines. CreateInterruptSet extends an IST by creating a new interrupt set. GetInterruptSetOptions identifies how the interrupt dispatching process will handle an interrupt set, and ChangeInterruptSetOptions enables modifications of the options. In addition, InstallInterruptFunctions installs ISRs in an interrupt member and the GetInterruptFunctions fetches interrupt control routines installed in an interrupt member.

The CreateInterruptSet function, when executed, extends the IST. The number of child nodes to be created, and the node set ID and the set node number of the parent are passed to the routine in order to identify the number of nodes to be created and to uniquely identify the parent of the new set. If successfully completed, the CreateInterruptSet returns the node set ID of the new set's child members.

The GetInterruptSetOptions routine returns the options which specify the dispatching behavior of the set. This is used to determine the additional behavior beyond a default behavior of the set. For example, it specifies whether a parent node is to be evaluated when a child node returns an interrupt not complete message. It follows that the routine ChangeInterruptSetOptions enables the modification of the behavior of the set.

The GetInterrupt Functions function fetches interrupt control routines installed in an interrupt member. Once the structure is in place, the InstallInterrupt Functions routine is called to install the ISRs of the added children and modified ISRs of existing nodes. In addition, routines to install interrupt enable and disable functions for the child nodes are executed. The routines to install and the ID of the node the routines are installed for are passed to the install routines. Once installation is complete, the installed routines will be invoked by the interrupt dispatching process.

As is discussed above, the IST is flexible in size and configuration. It is readily apparent that for a particular system configuration, certain IST structures and sub-structures may operate more efficiently than others. Although an optimum IST structure can vary from configuration to configuration, there are some guidelines to consider. For example, it is desirable to group devices or interrupt sources of similar priority or similar functionality together at certain levels. Therefore, the parameters used by the transversal ISRs will be common.

One example is to group serial devices together or to group devices having the same assigned level of priority (e.g., level 5) together. Distinctions may also be made between polled devices and devices which are identified for service with particularity by the hardware of the system. It is desirable that polled devices are not grouped under the same parent as hardware identified devices as the process of polling is more time consuming and this additional time will be reflected across the entire set under the parent. The overall structure of tree itself may be configured one way versus another based upon whether all or most of the devices are polled devices versus the hardware identified devices. For example, it may be desirable to limit the number of children under a particular parent if most of the devices are polled (to therefore limit the amount of polling at any particular level). Therefore a polled-device IST tends to be taller and hardware-identified IST tend to be wider.

The frequency a device generates an interrupt should also be considered. For example, it may be desirable to group all high frequency devices (i.e., devices that generate interrupts frequently) together to prevent the low frequency devices from not getting their interrupt requests attended to. Alternately, a transversal ISR of a particular parent node will have to be cognizant of those devices that generate interrupts frequently and prohibit the lower frequency devices from getting starved of attention. The above states exemplary guidelines and it is readily apparent that other criteria can be used.

The invention has been described in conjunction with the preferred embodiment. It is evident that numerous alternatives, modifications, variations and uses will be apparent to those skilled in the art in light of the foregoing description.

What is claimed is:

1. In a computer system comprising a processor and a plurality of devices coupled to a bus, an interrupt dispatching apparatus for determining an interrupt source from the plurality of devices that issued an interrupt request to the processor, said interrupt dispatching apparatus comprising:

an interrupt source tree (IST) comprising a plurality of hierarchically arranged nodes, said nodes comprising a root node and a plurality of leaf nodes connected to higher level nodes in the hierarchy through branches, said root node providing a branch direction to at least one leaf node, at least one of said leaf nodes comprising an identification of an interrupt source;

an interrupt dispatcher, responsive to an interrupt from an interrupt source, traversing said IST by invoking a routine pointed to by said root node to determine a branch direction to one of said plurality of leaf nodes, said one of said plurality of leaf nodes identifying said interrupt source.

2. An apparatus for servicing interrupt requests in a computer system, the apparatus comprising an interrupt source tree (IST) comprising a plurality of hierarchically arranged nodes including a plurality of leaf nodes, the plurality of leaf nodes identifying at least one interrupt handler.

3. The apparatus of claim 2 wherein at least one of said plurality of nodes points to a transversal routine for execution, the transversal routine, when executed, indicating a branch direction.

4. The apparatus of claim 2 wherein at least one of said plurality of nodes points to an interrupt disable routine (IDR) for execution, the IDR, when executed, disabling execution of the interrupt handler.

5. The apparatus of claim 2 wherein at least one of said plurality of nodes points to an interrupt enable routine (IER) for execution, the IER, when executed, enabling execution of the interrupt handler.

6. The apparatus of claim 2 wherein at least one of said plurality of nodes points to an interrupt acknowledge routine (IAR) for execution, the IAR, when executed, acknowledging an interrupt service request from a requesting device.

7. A method for servicing interrupt requests in a computer system, the method comprising the computer-implemented steps of:

generating an interrupt source tree (IST) comprising a plurality of hierarchically arranged nodes; and responsive to an interrupt request, traversing the IST to locate an interrupt handler pointed to by one of the plurality of nodes.

8. The method of claim 7 further comprising the step of traversing the IST in a reverse direction to determine if another interrupt request has been asserted.

9. The method of claim 7 wherein said step of traversing the IST to locate an interrupt handler comprises the steps of:

(a) setting one of the plurality of nodes comprised by the IST to be a current evaluation node;

(b) executing a routine pointed to by the current evaluation node, the routine generating a value;

(c) if the value identifies a child node of the current evaluation node, setting the child node to be the current evaluation node; and (d) repeating steps (b) through (c) until the value indicates that the interrupt handler has been located.

10. The method of claim 9 wherein said step of setting one of the plurality of nodes to be a current evaluation node comprises an initial step of setting a root node of the plurality of nodes to be the current evaluation node.

11. A method for controlling interrupt service in a computer system, the method comprising the steps of:

generating an interrupt source tree (IST) comprising a plurality of nodes hierarchically arranged to be traversed to locate and execute an interrupt handler pointed to by a leaf node of the plurality of nodes; and executing an interrupt disable routine (IDR) pointed to by the plurality of nodes to disable execution of the interrupt handler.

12. The method of claim 11 wherein said step of executing an IDR pointed to by the plurality of nodes comprises the step of executing an IDR pointed to by the leaf node.

13. The method of claim 11 further comprising the step of executing an interrupt enable routine (IER) pointed to by the leaf node to enable execution of the interrupt handler.

14. The method of claim 11 wherein said step of executing an IDR pointed to by the plurality of nodes comprises the step of executing an IDR pointed to by a first node of the plurality of nodes to disable traversal of the first node to reach a node of the IST on a branch extending from the first node to the leaf node.

15. The method of claim 14 further comprising the step of executing an interrupt enable routine (IER) pointed to by the first node to enable traversal of the first node to reach the leaf node.

16. The method of claim 15 wherein said step of executing an IER pointed to by the first node comprises the step of enabling traversal of at least one node of the IST hierarchically higher than the first node.

17. The method of claim 16 wherein said step of enabling traversal of at least one node of the IST hierarchically higher than the first node comprises the steps of:

traversing the IST from the first node to a hierarchically higher node of the plurality of nodes; and executing an IER pointed to by the hierarchically higher node.

18. The method of claim 14 further comprising the step of executing an interrupt enable routine (IER) pointed to by a second node of the plurality of nodes to enable traversal of the first node to reach the leaf node, the second node being on the branch extending from the first node to the leaf node.

19. The method of claim 14 further comprising the step of executing an interrupt enable routine (IER) pointed to by the leaf node to enable traversal of nodes of the IST hierarchically higher than the leaf node to reach the leaf node.

20. A method for servicing interrupt requests in a computer system, the method comprising the computer-implemented steps of:

(a) generating an interrupt source tree (IST) comprising a hierarchical structure of nodes including a root node and a plurality of leaf nodes connected to the root node via branches;

(b) traversing the IST from the root node of the IST to a first leaf node of the IST in response to a first interrupt request; and (c) executing an interrupt handler pointed to by the first leaf node to service the first interrupt request.

21. The method of claim 20 wherein said step of traversing an IST from a root node to a first leaf node comprises the steps of:

(b1) setting the root node to be a current evaluation node;

(b2) executing a transversal routine pointed to by the current evaluation node, the transversal routine generating a value;

(b3) if the value identifies a child node of the current evaluation node, setting the child node to be the current evaluation node; and (b4) if the value identifies a child node of the current evaluation node, repeating steps (b2) through (b3).

22. The method of claim 21 wherein said step of executing a transversal routine comprises the step of preventing successive servicing of interrupt requests generated by a first device during an interval in which a second device generates an interrupt request.

23. The method of claim 20 wherein after said step of (c) executing an interrupt handler, the method further comprises the steps of:

(d) setting a parent node of the current evaluation node to be the current evaluation node;

(e) executing a transversal routine pointed to by the current evaluation node; and (f) repeating steps (d) through (e) until the transversal routine identifies a child node of the current evaluation node or until the current evaluation node is the root node.

24. The method of claim 23 further comprising the step of:

(g) if the transversal routine identifies a child node of the current evaluation node, performing the following steps:

(g1) traversing the IST from the current evaluation node to a second leaf node, the child node being on a branch of the IST comprising the second leaf node; and (g2) executing an interrupt handler pointed to by the second leaf node.

25. The method of claim 20 wherein after said step of (c) executing an interrupt handler, the method further comprises the steps of:

(d) if the current evaluation node comprises a modifying option, setting a node of the IST identified by the modifying option to be the current evaluation node;

(e) if the current evaluation node does not comprise a modifying option, setting a parent node of the current evaluation node to be the current evaluation node;

(f) executing a transversal routine pointed to by the current evaluation node; and (g) repeating steps (d) through (f) until the transversal routine identifies a child node of the current evaluation node or until the current evaluation node is the root node.

26. The method of claim 25 further comprising the step of:

(h) if the transversal routine identifies a child node of the current evaluation node, performing the following steps:

(h1) traversing the IST from the current evaluation node to a second leaf node, the child node being on a branch of the IST comprising the second leaf node; and (h2) executing an interrupt handler pointed to by the second leaf node.

27. A method for servicing interrupt requests in a computer system, the method comprising the steps of:

(a) generating an interrupt source tree (IST) comprising a plurality of nodes;

(b) setting a root node of the plurality of nodes to be a current evaluation node;

(c) executing a routine pointed to by the current evaluation node, the routine generating a value;

(d) if the value identifies a child node of the current evaluation node, setting the child node to be the current evaluation node;

(e) repeating steps (c) through (d) until the value does not identify a child node of the current evaluation node;

(f) if the value indicates that an interrupt handler has executed, but an interrupt request has not been serviced, and if the current evaluation node is not the root node, repeating the following steps until the current evaluation node is the root node or until the value indicates that an interrupt request has been serviced:

(f1) determining whether the parent node of the current evaluation node is to be reevaluated;

(f2) if the parent node of the current evaluation node is to be reevaluated, performing the following steps:

(f2a) setting a parent node of the current evaluation node to be the current evaluation node;

(f2b) repeating steps (c) through (f);

(f3) if the parent node of the current evaluation node is not to be reevaluated, and if another child node of a set of child nodes comprising the current evaluation node has not been set to be the current evaluation node, performing the following steps:

(f3a) setting the other child node to be the current evaluation node;

(f3b) repeating steps (c) through (f);

(f4) if the parent node of the current evaluation node is not to be reevaluated, and if each child node of the set of child nodes comprising the current evaluation node has been set to be the current evaluation node, setting a parent node of the current evaluation node to be the current evaluation node;

(g) if the value indicates that an interrupt handler has serviced an interrupt request, and if the current evaluation node is not a root node of the IST, repeating the following steps until the current evaluation node is the root node:

(g1) setting the parent node of the current evaluation node to be the current evaluation node;

(g2) determining whether the parent node of the current evaluation node is to be reevaluated; and (g3) if the parent node of the current evaluation node is to be reevaluated, repeating steps (c) through (g).

28. The method of claim 27 wherein said step (f1) of determining whether the parent node of the current evaluation node is to be reevaluated comprises the step of examining the current evaluation node.

* * * * *